(12) United States Patent
Wang

(10) Patent No.: US 11,500,523 B2
(45) Date of Patent: Nov. 15, 2022

(54) METHOD, APPARATUS, ELECTRONIC DEVICE AND MACHINE-READABLE STORAGE MEDIUM FOR MESSAGE PROCESSING WITH MARK ADDING OPERATION

(71) Applicant: BEIJING XIAOMI MOBILE SOFTWARE CO., LTD., Beijing (CN)

(72) Inventor: Xi Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 139 days.

(21) Appl. No.: 16/693,265

(22) Filed: Nov. 23, 2019

(65) Prior Publication Data
US 2020/0363921 A1 Nov. 19, 2020

(30) Foreign Application Priority Data
May 17, 2019 (CN) .......................... 201910411094.4

(51) Int. Cl.
| | | |
|---|---|---|
| *G06F 3/0484* | (2022.01) | |
| *H04L 51/04* | (2022.01) | |
| *H04L 51/216* | (2022.01) | |
| *H04L 51/10* | (2022.01) | |
| *G06F 3/04883* | (2022.01) | |

(52) U.S. Cl.
CPC ........ *G06F 3/0484* (2013.01); *G06F 3/04883* (2013.01); *H04L 51/04* (2013.01); *H04L 51/10* (2013.01); *H04L 51/216* (2022.05)

(58) Field of Classification Search
CPC .. G06F 3/0484; G06F 3/0482; G06F 3/04883; G06F 3/04842; G06F 40/166; H04L 51/04; H04L 51/16; H04L 51/10; H04L 51/216
See application file for complete search history.

(56) References Cited

U.S. PATENT DOCUMENTS

| | | | |
|---|---|---|---|
| 10,536,411 B2 * | 1/2020 | Deets, Jr. ................ | H04L 51/16 |
| 2009/0282347 A1 | 11/2009 | Abernethy et al. | |
| 2012/0023447 A1 * | 1/2012 | Hoshino ............... | G06F 16/353 |
| | | | 715/823 |

(Continued)

FOREIGN PATENT DOCUMENTS

| | | |
|---|---|---|
| CN | 106020595 A | 10/2016 |
| CN | 106020596 A | 10/2016 |

OTHER PUBLICATIONS

Harry Guinness, "How to Quote Someone In WhatsApp," Jan. 16, 2018, https://www.howtogeek.com/339005/how-to-quote-someone-in-whatsapp/, 10 pages (Year: 2018).*

(Continued)

*Primary Examiner* — Nicholas Ulrich
(74) *Attorney, Agent, or Firm* — Syncoda LLC; Feng Ma

(57) ABSTRACT

A message processing method includes: acquiring a mark adding operation for at least a part of a target message; acquiring an input remarking message according to the mark adding operation; and outputting a marking identification for the remarking message. The marking identification can include the remarking message and an associative identification for associating the remarking message with the target message.

14 Claims, 12 Drawing Sheets

---

```
┌──────────────────────────────────────────────────────────┐
│  acquiring a mark adding operation for at least a part   │  101
│  of a target message                                     │
└──────────────────────────────────────────────────────────┘
                              │
                              ▼
┌──────────────────────────────────────────────────────────┐
│  acquiring an input remarking message according to the   │  102
│  mark adding operation                                   │
└──────────────────────────────────────────────────────────┘
                              │
                              ▼
┌──────────────────────────────────────────────────────────┐
│  outputting a marking identification for the remarking   │
│  message, where the marking identification includes the  │  103
│  remarking message and an associative identification for │
│  associating the remarking message with the target       │
│  message                                                 │
└──────────────────────────────────────────────────────────┘
```

(56) References Cited

U.S. PATENT DOCUMENTS

| | | | | |
|---|---|---|---|---|
| 2015/0038121 A1* | 2/2015 | Koum | ............... | H04M 3/42382 |
| | | | | 455/412.2 |
| 2015/0350122 A1* | 12/2015 | Roch | ....................... | H04L 51/04 |
| | | | | 709/204 |
| 2015/0373281 A1* | 12/2015 | White | .................. | G11B 27/002 |
| | | | | 348/660 |
| 2016/0226802 A1* | 8/2016 | Wang | ....................... | H04L 51/58 |
| 2016/0364368 A1* | 12/2016 | Chen | .................... | H04L 51/216 |
| 2018/0203586 A1* | 7/2018 | Cohen | .................... | H04L 51/04 |

OTHER PUBLICATIONS

Extended European Search Report for EP Application No. 19212207.5 dated May 25, 2020.
OA for ON Application 201910411094.4, dated Jun. 1, 2020.

* cited by examiner

METHOD, APPARATUS, ELECTRONIC DEVICE AND MACHINE-READABLE STORAGE MEDIUM FOR MESSAGE PROCESSING WITH MARK ADDING OPERATION

CROSS-REFERENCE TO RELATED APPLICATION

This application claims priority to Chinese Patent Application No. 201910411094.4 filed on May 17, 2019, the entire content of which is incorporated herein by reference.

BACKGROUND

In a group chatting process among several users, the chat window typically will be rapidly refreshed by messages sent by individual users. If a user wants to remark on a certain message, the user returns to the chat record, copy the message for remarking, and remind (for example, @) the sender of the message.

SUMMARY

The present disclosure generally relates to the field of data processing technique, and more particularly, to a message processing method and apparatus, an electronic device and a machine-readable storage medium.

Embodiments of the present disclosure provide a message processing method and apparatus, an electronic device and a machine-readable storage medium.

According to a first aspect of embodiments of the present disclosure, there is provided a message processing method, including: acquiring a mark adding operation for at least a part of a target message; acquiring an input remarking message according to the mark adding operation; and outputting a marking identification for the remarking message. The marking identification includes the remarking message and an associative identification for associating the remarking message with the target message.

According to a second aspect of embodiments of the present disclosure, there is provided a message processing apparatus, including: a first acquiring module, configured to acquire a mark adding operation for at least a part of a target message; a second acquiring module, configured to acquire an input remarking message according to the mark adding operation; and an outputting module, configured to output a marking identification for the remarking message. The marking identification includes the remarking message and an associative identification for associating the remarking message with the target message.

According to a third aspect of embodiments of the present disclosure, there is provided an electronic device, including: a processor; and a memory for storing instructions executable by the processor. The processor is configured to read the executable instructions from the memory to execute the message processing method according to any embodiment in the first aspect of the present disclosure.

According to a fourth aspect of embodiments of the present disclosure, there is provided a machine-readable storage medium having stored therein instructions executable by the machine. The instructions, when executed, cause the message processing method according to any embodiment in the first aspect of the present disclosure to be performed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Figure 1:
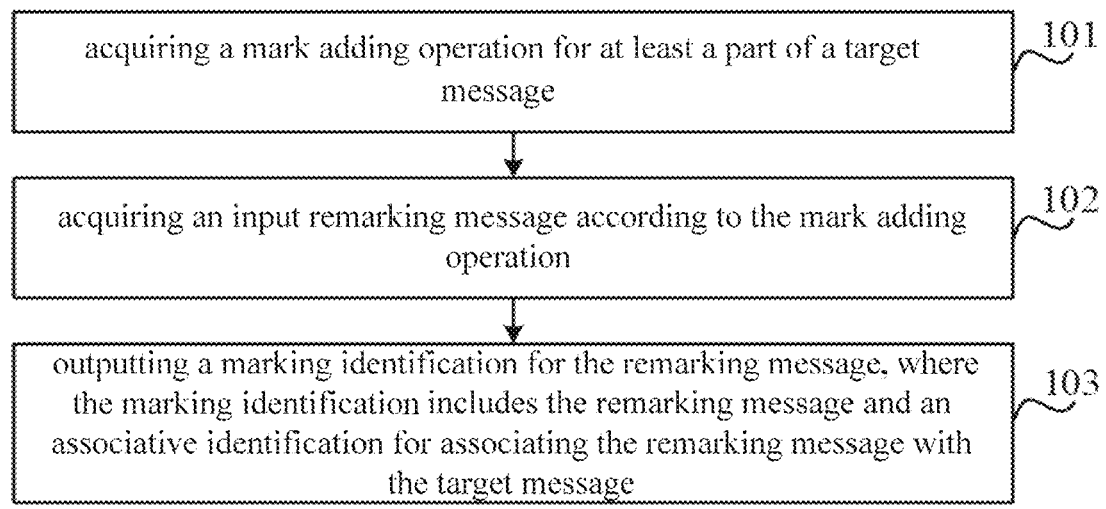
FIG. 1 is a flowchart of a message processing method according to some embodiments of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with aspects related to the present disclosure as recited in the appended claims.

In typical group chatting applications (APPs), there will exist multiple pieces of other messages between the remarking message and the message being remarked, which may make other users in the chatting group fail to correctly connect the remarking message to the context, leading to confusion or misunderstanding of the original meaning of the remarking message and reducing the fun of chatting.

Embodiments of the present disclosure provide a message processing method and apparatus, an electronic device and a machine-readable storage medium, with a concept that when a user wants to remark on a part of a target message sent by other users, the user can mark the part of the target message with a marking identification, which will facilitate the sender of the target message to locate the target message, and timely check the target message and the remarking message, reducing the time taken for finding the target message, thereby improving the reading fluency and reading efficiency, and enhancing the fun of chatting.

According to a first aspect of embodiments of the present disclosure, there is provided a message processing method, including: acquiring a mark adding operation for at least a part of a target message; acquiring an input remarking message according to the mark adding operation; and outputting a marking identification for the remarking message. The marking identification includes the remarking message and an associative identification for associating the remarking message with the target message.

In some embodiments, the target message is an instant message; and the target message includes at least one selected from a text message, a voice message, an image message and a video message.

In some embodiments, the target message is the text message, and the at least a part of the target message is at least a part of the text message.

In some embodiments, the target message is the voice message, and the at least a part of the target message is at least a segment of the voice message.

In some embodiments, the target message is the image message, and the at least a part of the target message is at least a region of the image message.

In some embodiments, the target message is the video message, and the at least a part of the target message is at least a segment of the video message.

In some embodiments, outputting a marking identification for the remarking message includes at least one of:

displaying the associative identification directing at the remarking message and the target message, where the associative identification is an identifier pointing to the remarking message and the target message; or displaying the same associative identification added for the remarking message and the target message, where the associative identification includes at least one selected from a frame, a symbol and format transformation.

In some embodiments, the marking identification further includes information of a user adding the remarking message.

According to a second aspect of embodiments of the present disclosure, there is provided a message processing apparatus, including: a first acquiring module, configured to acquire a mark adding operation for at least a part of a target message; a second acquiring module, configured to acquire an input remarking message according to the mark adding operation; and an outputting module, configured to output a marking identification for the remarking message. The marking identification includes the remarking message and an associative identification for associating the remarking message with the target message.

In some embodiments, the target message is an instant message; and the target message includes at least one selected from a text message, a voice message, an image message and a video message.

In some embodiments, the target message is the text message, and the at least a part of the target message is at least a part of the text message.

In some embodiments, the target message is the voice message, and the at least a part of the target message is at least a segment of the voice message.

In some embodiments, the target message is the image message, and the at least a part of the target message is at least a region of the image message.

In some embodiments, the target message is the video message, and the at least a part of the target message is at least a segment of the video message.

In some embodiments, the outputting module includes at least one of:

a first displaying unit, configured to display the associative identification directing at the remarking message and the target message, where the associative identification is an identifier pointing to the remarking message and the target message, and a second displaying unit, configured to display the same associative identification added for the remarking message and the target message, where the associative identification includes at least one selected from a frame, a symbol and format transformation.

In some embodiments, the marking identification further includes information of a user adding the remarking message.

According to a third aspect of embodiments of the present disclosure, there is provided an electronic device, including: a processor; and a memory for storing instructions executable by the processor. The processor is configured to read the executable instructions from the memory to execute the message processing method according to any embodiment in the first aspect of the present disclosure.

According to a fourth aspect of embodiments of the present disclosure, there is provided a machine-readable storage medium having stored therein instructions executable by the machine. The instructions, when executed, cause the message processing method according to any embodiment in the first aspect of the present disclosure to be performed.

In the following, the message processing method and apparatus, the electronic device and the machine-readable storage medium according to embodiments of the present disclosure will be described in detail, with reference to FIGS. 1-12.

FIG. 1 is a flowchart of a message processing method according to some embodiments of the present disclosure, which is applicable to instant messaging software.

Figure 2:
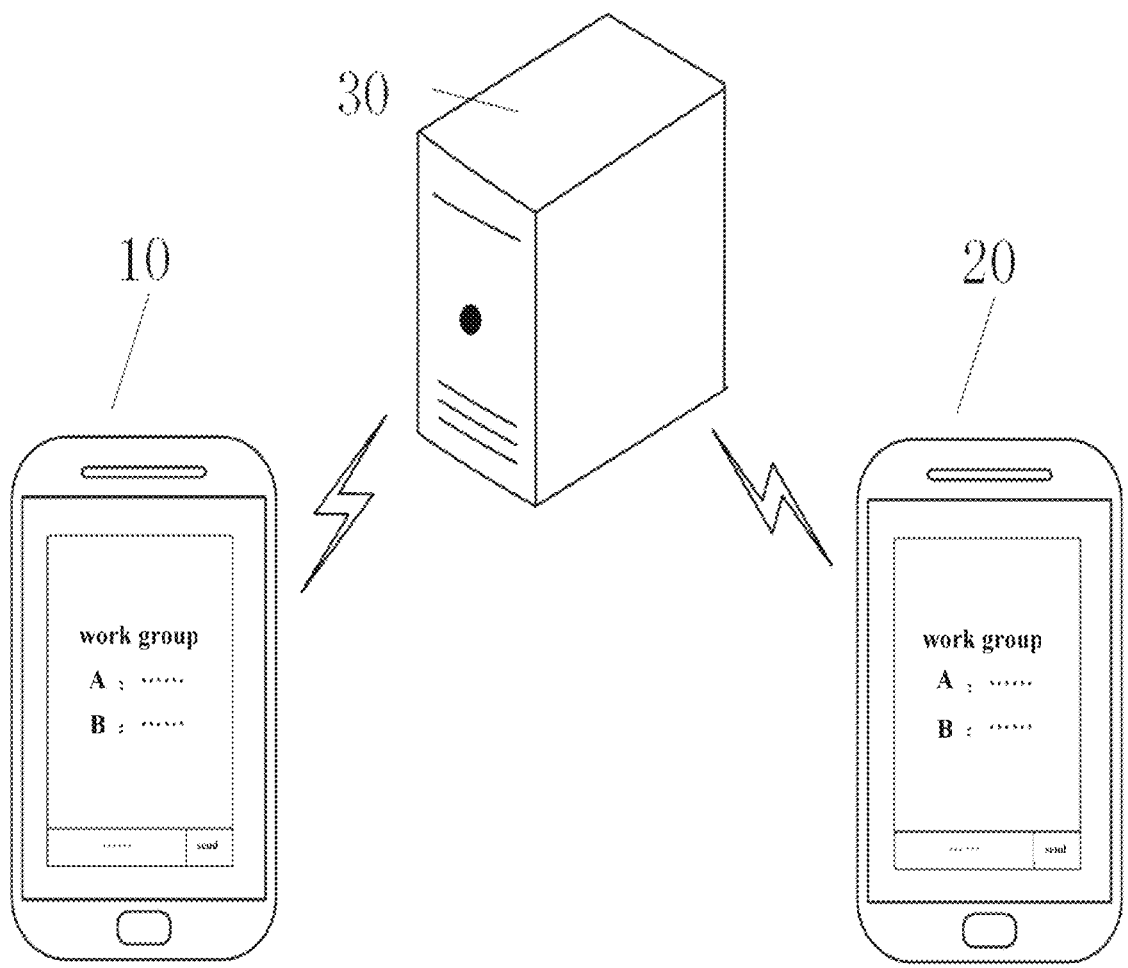
FIG. 2 is a schematic diagram illustrating an application scenario of a message processing method according to some embodiments of the present disclosure.

FIG. 2 is a schematic diagram showing an application scenario of a message processing method according to some embodiments of the present disclosure, where electronic devices 10 and 20 and a server 30 are included, the electronic devices 10 and 20 each are installed with the instant messaging software, and the server 30 is configured as a transfer station of the electronic devices 10 and 20 to provide information for the electronic devices 10 and 20.

For the convenience of description, it is assumed that the electronic device 10 is the device a user of which performs a mark adding operation for a selected target message, and the electronic device 20 is the device to receive the target message with a marking identification. As shown in FIG. 2, each user in a chatting group can input and send a message to the instant messaging software, and all the users in this group can read the message displayed in a display region of the instant messaging software.

It can be understood that, there can be one or a plurality of electronic devices 20, and the electronic device 20 and the electronic device 10 can change roles based on whether its user has the need to mark a part of the target message, that is, each of the electronic devices 10 and 20 can serve as both a sender and a receiver for the target message, but for the same piece of target message, the electronic device 10 serve as one party of the sender and the receiver, and the electronic device 20 serve as the other party of the sender and the receiver.

Based on the application scenario illustrated in FIG. 2 and referring to FIG. 1, embodiments of the present disclosure provide a message processing method, which is applied to the electronic device 10 and includes the following acts as illustrated at blocks of FIG. 1.

At block 101, a mark adding operation for at least a part of a target message is acquired.

In this embodiment, the electronic device can display instant messages sent by individual users in the display region of the instant messaging software. The instant message can include at least one selected from a text message, a voice message, an image message and a video message.

In a practical application, a user can perform various operations on a certain instant message in the display region, including but not being limited to such as a click operation, a copy operation, a mark adding operation, etc. It should be noted that the term "mark adding operation" as used herein refers to selecting at least a part of a certain instant message (hereinafter referred to as a target message) as an object to be marked. It will be appreciated that the target message includes at least one selected from a text message, a voice message, an image message and a video message.

Figure 3:
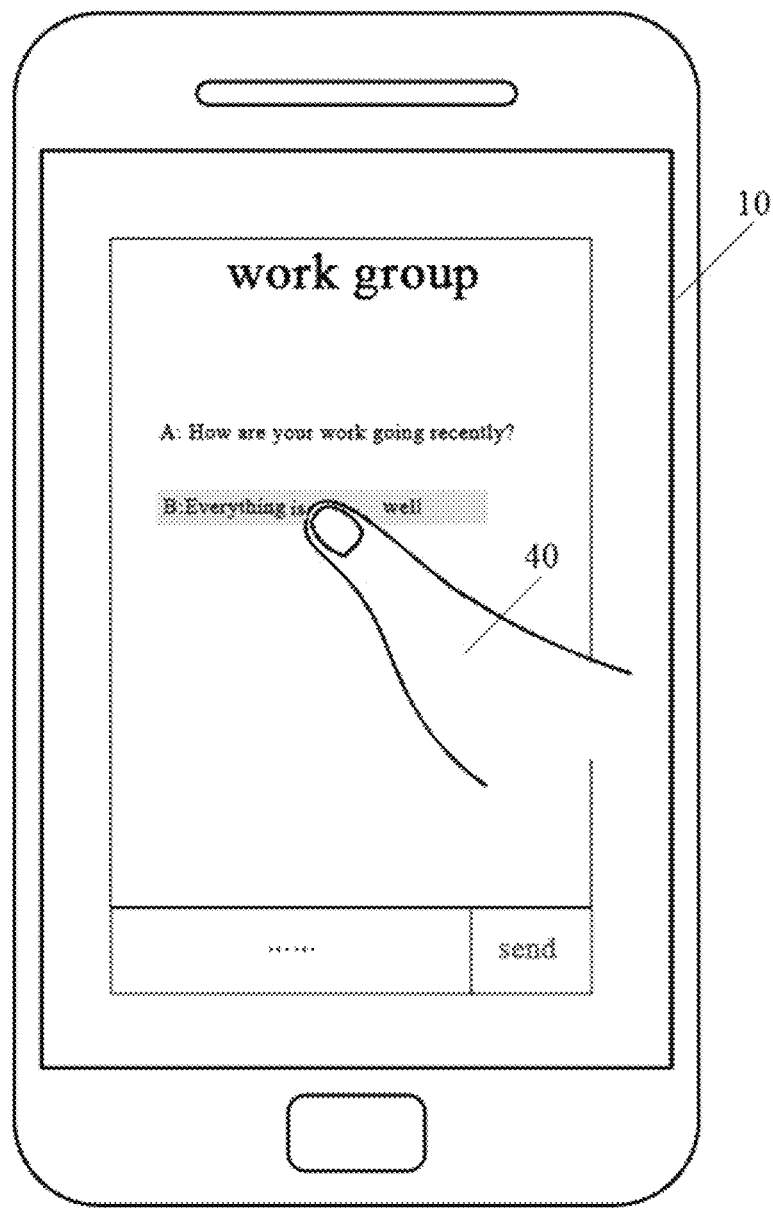
FIG. 3 is a schematic operation diagram according to some embodiments of the present disclosure.

For example, as shown in FIG. 3, the electronic device 10 displays the instant messages sent by individual users in the display region, such as "User A: How are your work going recently?", "User B: Everything is going well", and the like. The user of the electronic device 10 can select the instant message "User B: Everything is going well", in such a case, the electronic device 10 can determine the mark adding operation of the user on the message "Everything is going well".

It will be appreciated that, the user of the electronic device 10 can also slide over the instant message "Everything is going well" from left to right or from right to left in the display region. After detecting the sliding operation of the user, the electronic device 10 determines the message "Everything is going well" to be the content for which a remarking message needs to be added. In this case, the sliding operation is the mark adding operation.

It should be noted that the above embodiment only introduces the case where the target message is the text message. In some embodiments where the target message is the voice message, the at least a part of the target message is at least a segment of the voice message. In this case, the mark adding operation can be a segment selecting operation which includes a starting time point and an ending time point, and a voice segment between the starting time point and the ending time point is the selected part of the target message.

In some embodiments, the target message is the image message, and the at least a part of the target message is at least a region of the image message. In this case, the mark adding operation can be a click selecting operation, and an object corresponding to a position where the click selecting operation is performed is the selected partial region of the image message. It will be appreciated that the object corresponding to the position where the click selecting operation is performed can be a certain object in the image message, such as a table, a person, a plant, etc. The object in the image message can be recognized by means of an image recognition algorithm in the related art, which will not be elaborated herein.

In some embodiments, the target message is the video message, and the at least a part of the target message is at least a segment of the video message. In this case, the mark adding operation can be a segment selecting operation which includes a starting time point and an ending time point, and a video segment between the starting time point and the ending time point is the selected part of the target message.

It will be appreciated that, the target message can include other forms of instant message, and those skilled in the art can set a suitable mark adding operation based on the characteristics of other forms of instant message for selecting at least a part of the instant message, which also falls into the protection scope of the present disclosure.

In some embodiments, after the user slides over the instant message or performs a click selecting operation on the instant message, the electronic device can also actively or passively pop up a selection box, in which different operation options are listed, such as a mark adding operation, a copy operation, a screenshot operation, etc. The user can choose a suitable operation according to a specific scenario, which will not be limited herein.

Figure 4:
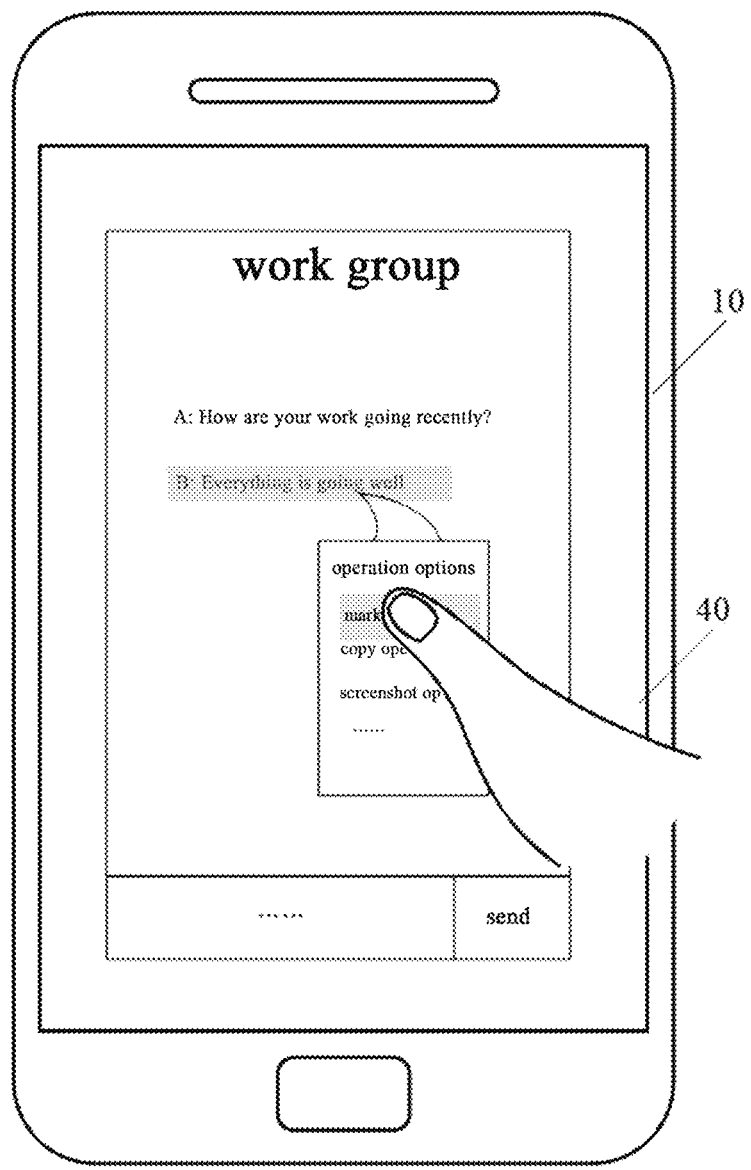
FIG. 4 is a schematic operation diagram according to some embodiments of the present disclosure.
Figure 5:
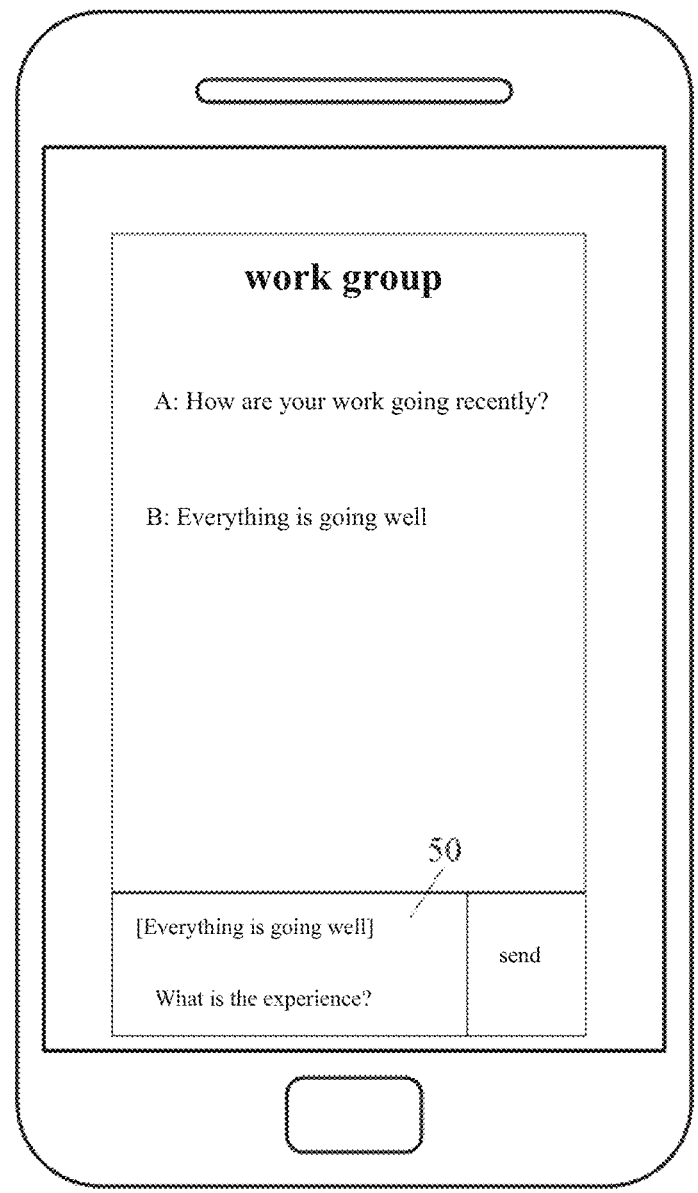
FIG. 5 is a schematic effect diagram of a message processing method according to some embodiments of the present disclosure.

For example, referring to FIG. 4, the mark adding operation is chosen by the user, and the electronic device detects a trigger position of the user and highlights the operation option (for example, shading the background) corresponding to the trigger position for the convenience of user to view.

At block 102, an input remarking message is acquired according to the mark adding operation.

In some embodiments, after determining the mark adding operation of the user, the electronic device 10 can acquire the remarking message input by the user for the at least a part of the target message. The techniques for acquiring the input message can refer to the relevant technology, which will not be elaborated here.

At block 103, a marking identification for the remarking message is output. The marking identification includes: the remarking message and an associative identification for associating the remarking message with the target message.

In some embodiments, the electronic device 10 outputs the marking identification for the remarking message. The outputting operation can include outputting the marking identification from the electronic device to itself for being displayed on its own display screen and to the electronic device 20 for being displayed on a display screen of the electronic device 20. It should be noted that, the outputting operation of the electronic device 10 can be performed actively or be performed in response to a trigger operation of the user, which will not be limited herein.

Figure 6:
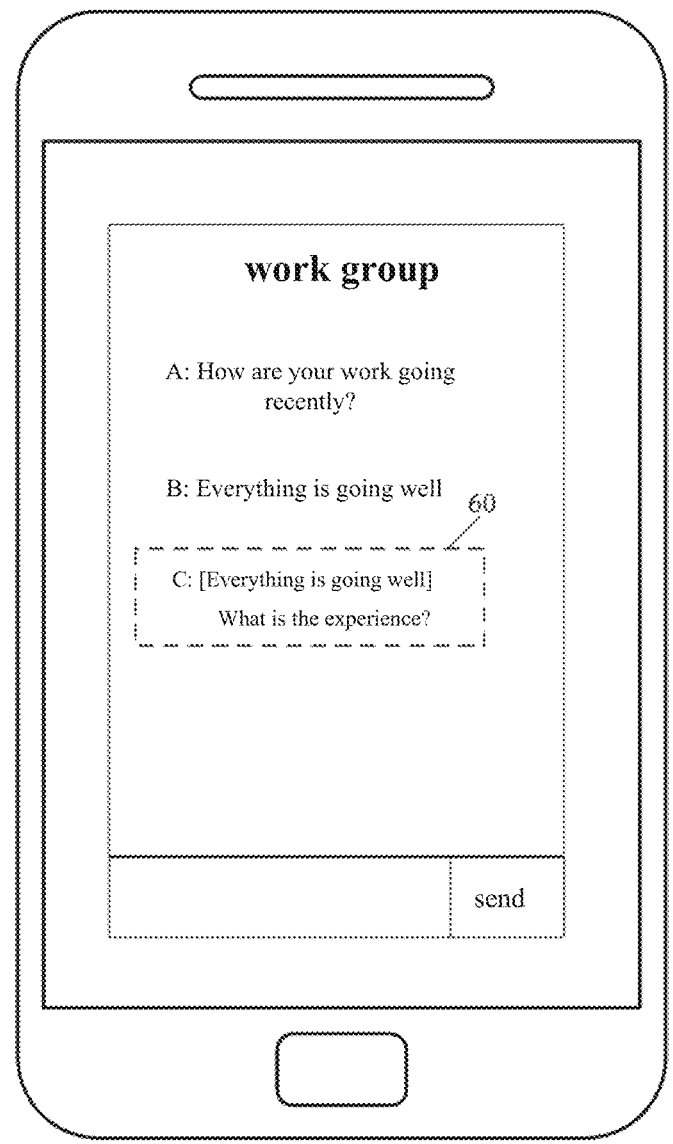
FIG. 6 is a schematic effect diagram of a message processing method according to some embodiments of the present disclosure.
Figure 7:
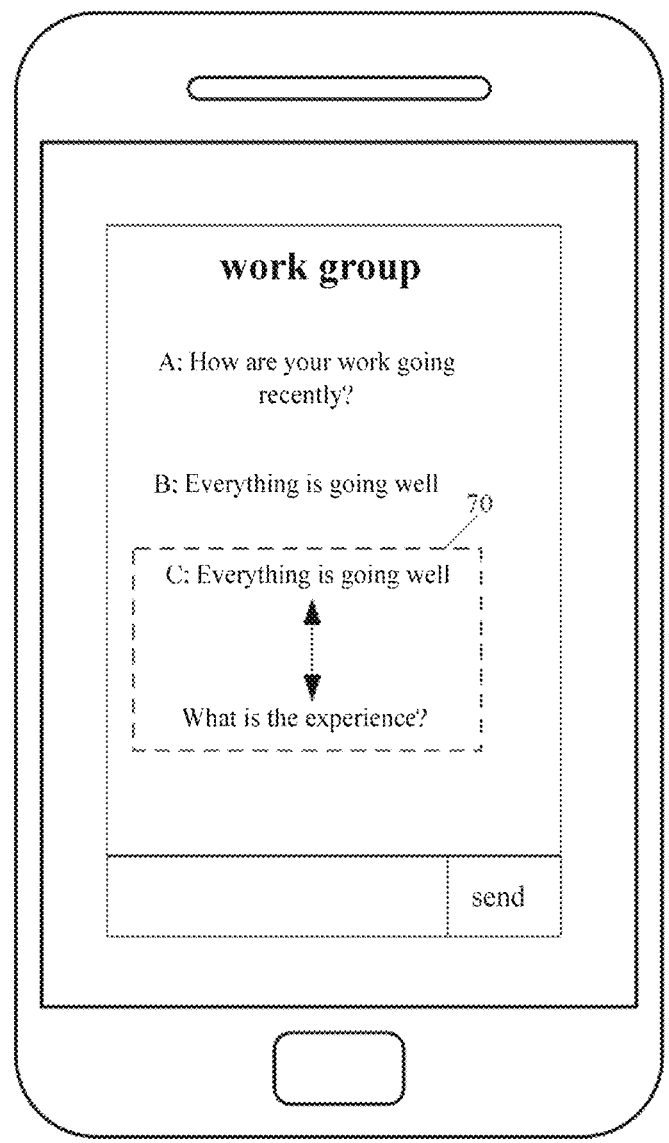
FIG. 7 is a schematic effect diagram of a message processing method according to some embodiments of the present disclosure.

In some embodiments, for example, a processor of the electronic device 20 is also capable of detecting a displaying operation for the remarking message. The displaying operation can come from the electronic device 10 or from a prompt message output by the electronic device 20. In response to the detected displaying operation, the electronic device 20 displays the marking identification for the target message. The marking identification includes the remarking message and the associative identification for associating the remarking message with the target message. FIG. 6 shows the displaying effect of the marking identification according to some embodiments of the present disclosure. Referring to FIG. 6, in a dotted frame 60, the remarking message of User C directing at the message "Everything is going well" of User B is "What is the experience?", and the associative identification is brackets "[ ]". It should be noted that, the associative identification in embodiments of the present disclosure can be in other forms, including but not be limited to the followings.

In some embodiments, the associative identification can be an identifier pointing to the remarking message and the target message. The identifier includes but is not limited to a connecting line, an arrow, etc. Taking a double-headed arrow as an example of the identifier, referring to FIG. 7, in a dotted frame 70, a part of the target message is "Everything is going well", the remarking message is "What is the experience?", and the associative identifier is the double-headed arrow. In this way, when seeing the double-headed arrow, the user can confirm that an association is present between the upper message "Everything is going well" and the lower message "What is the experience?".

In some embodiments, the associative identification can also include but not be limited to at least one selected from a frame, a symbol and format transformation.

Figure 8:
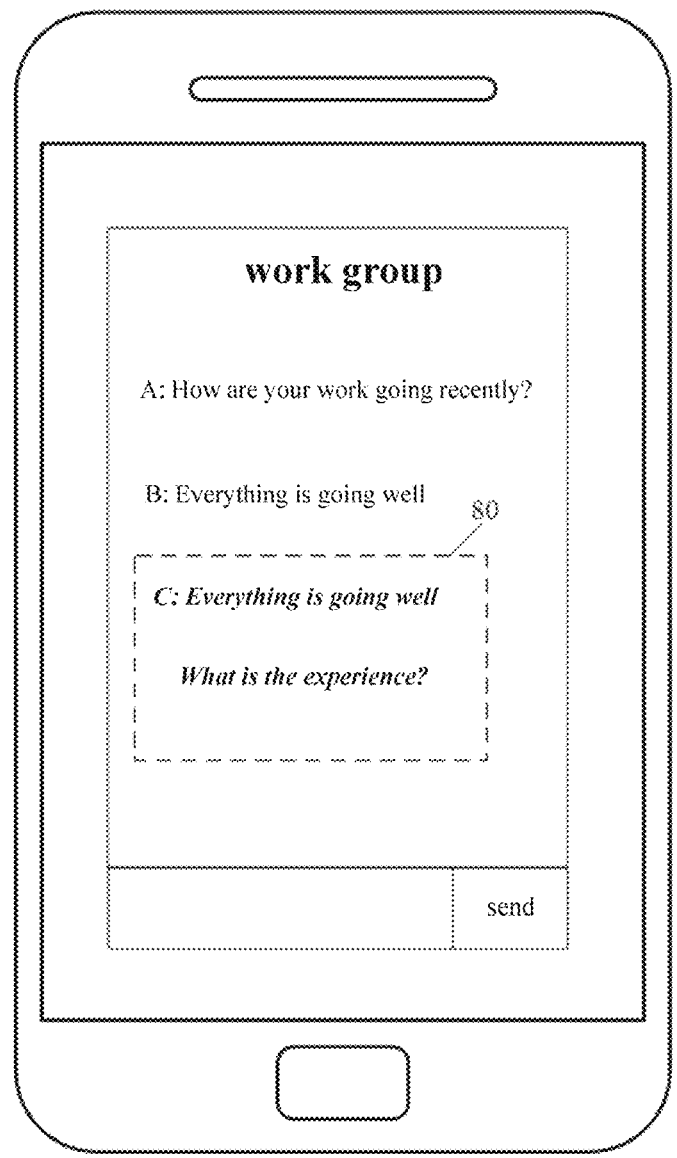
FIG. 8 is a schematic effect diagram of a message processing method according to some embodiments of the present disclosure.

It should be noted that, in some embodiments, the at least a part of the target message is the text message, the associative identification can be the frame, including but not be limited to a rectangular frame, an elliptical frame, a diamond frame, a solid line frame, a dotted line frame, etc. Any frame can be used as the associative identification as long as it can distinguish the marking identification from other displayed contents. In some embodiments, the symbol can include but not be limited to parentheses, single quotation marks, double quotation marks, marks of emphasis, underline, etc. The format transformation can include but not be limited to style transformation, font transformation (such as bold, italics), or color transformation. Taking the format transformation as an example, as shown in FIG. 8, in a dotted frame 80, a part of the target message is "Everything is going well", the remarking message is "What is the experience?", and the associative identifier is that both the part of the target message and the remarking message apply the bold and italic font. In this way, when seeing contents in the same font, the user can confirm that an association is present between the upper message "Everything is going well" and the lower message "What is the experience?" shown in FIG. 8. In a practical application, in order to distinguish the part of the target message and the remarking message, at least one blank line can be added therebetween so as to increase the distinguishability.

In some embodiments, the at least a part of the target message is at least a region of the image message, the associative identification can include but not be limited to a text box, an arrow, colors, etc. In some embodiments, the associative identification is the text box, for example, an object on an image message to which a top corner of the text box points is the at least a part of the target message, and the remarking content is contained in the text box, in this way, an association between the target message and the remarking content is formed via the text box. In some embodiments, the associative identification is the arrow, for example, an object on an image to which a head of the arrow points is the at least a part of the target message, and the remarking content is located near a tail of the arrow, in this way, an association between the target message and the remarking content is formed via the arrow. In some embodiments, the associative identification is indicated by the color, for example, an object on an image is adjusted to a preset color, and the remarking content is adjusted to the same color as the object on the image, in this way, an association between the target message and the remarking content is formed via the same color.

In some embodiments, the at least a part of the target message is at least a segment of the video message, and the associative identification can include but not be limited to a text box, an arrow, etc. In some embodiments, the associative identification is the text box, for example, two connecting lines from a top corner of the text box point to a staring time point and an ending time point of a segment of a video message, respectively, and the remarking content is contained in the text box, in this way, an association between the segment of the video message and the remarking content is formed via the text box. In some embodiments, the associative identification is the arrow, for example, heads of two arrows point to a staring time point and an ending time point of a segment of a video message, respectively, and the remarking content is located near tails of the arrows, in this way, an association between the segment of the video message and the remarking content is formed via the arrow.

In some embodiments, the at least a part of the target message is at least a segment of the voice message, and the associative identification can include but not be limited to a text box, an arrow, etc. In some embodiments, the associative identification is the text box, for example, two connecting lines from a top corner of the text box point to a staring time point and an ending time point of a segment of a voice message, respectively, and the remarking content is contained in the text box, in this way, an association between the segment of the voice message and the remarking content is formed via the text box. In some embodiments, the associative identification is the arrow, for example, heads of two arrows point to a staring time point and an ending time point of a segment of a voice message, respectively, and the remarking content is located near tails of the arrows, in this way, an association between the segment of the voice message and the remarking content is formed via the arrow.

It should be noted that, the above embodiments just illustrate the forms of the associative identification, and it will be appreciated that other manners for associating the remarking message with the target message can also be set by those skilled in the related art based on specific scenarios, which also fall into the protection scope of the present disclosure.

In some embodiments, the marking identification can further include information of a user adding the remarking message. As illustrated in FIG. 8, the information of the user adding the remarking message can be "User C" in the dotted frame 80. In some embodiments, the information of the user can be other personal information, including but not be limited to account information or chatting records, of the user, thereby increasing the understanding of other users to the user adding the remarking message.

With the message processing method according embodiments of the present disclosure, the mark adding operation for at least a part of the target message is acquired; the input remarking message is acquired according to the mark adding operation; and the marking identification for the remarking message is output, where the marking identification includes: the remarking message and the associative identification for associating the remarking message with the target message. In this way, the remarking message can be associated with the at least a part of the target message via the marking identification, which is convenient for all users to locate and read the remarking message and the at least a part of the target message, thereby improving the reading efficiency and increasing the fun of chatting.

Figure 9:
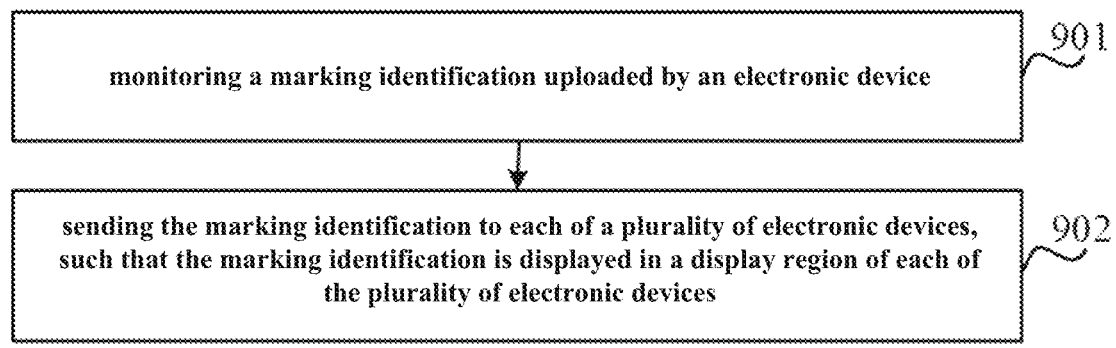
FIG. 9 is a flowchart of a message processing method according to some embodiments of the present disclosure.

Based on the application scenario shown in FIG. 2, embodiments of the present disclosure further provide a message processing method. FIG. 9 is a flowchart of a message processing method according to some embodiments of the present disclosure. Referring to FIG. 9, the message processing method can be applied to the server 30 and include the following acts as illustrated at blocks of FIG. 9.

At block 901, a marking identification uploaded by an electronic device is monitored.

In this embodiment, the server 30 can keep communication with electronic devices 10 and 20. In communicating with the electronic device 10, the server 30 can monitor the marking identification uploaded by the electronic device periodically or in real time.

It should be noted that, regarding how to determine the at least a part of the target message, the remarking content and the associative identification according to the marking identification, reference can be made to the acts of the message processing method as illustrated in embodiments described in combination with FIG. 1 to FIG. 8, which will not be elaborated herein.

At block 902, the marking identification is sent to each of a plurality of electronic devices, such that the marking identification is displayed in a display region of each of the plurality of electronic devices.

In this embodiment, the server 30 can send the marking identification to each of the plurality of electronic devices periodically or in real time, such that each user in a group can see the marking identification as shown in FIG. 8 on their own electronic devices.

In some embodiments, before sending the marking identification to each of the plurality of electronic devices, the server 30 can also acquire an area required for displaying the marking identification in the display region as well as a preset threshold. The preset threshold can include an area ratio threshold of an area to be occupied by the marking identification to an area of the display region or a threshold of the number of lines to be occupied by the marking identification. When a ratio of the required area to the area of the display region is greater than the area ratio threshold, the server 30 will folds the remarking message and/or the target message and then sends the fold message(s) to each electronic device. In an example, the target message is folded, and a display effect of the folded target message is as shown in FIG. 10.

Figure 10:
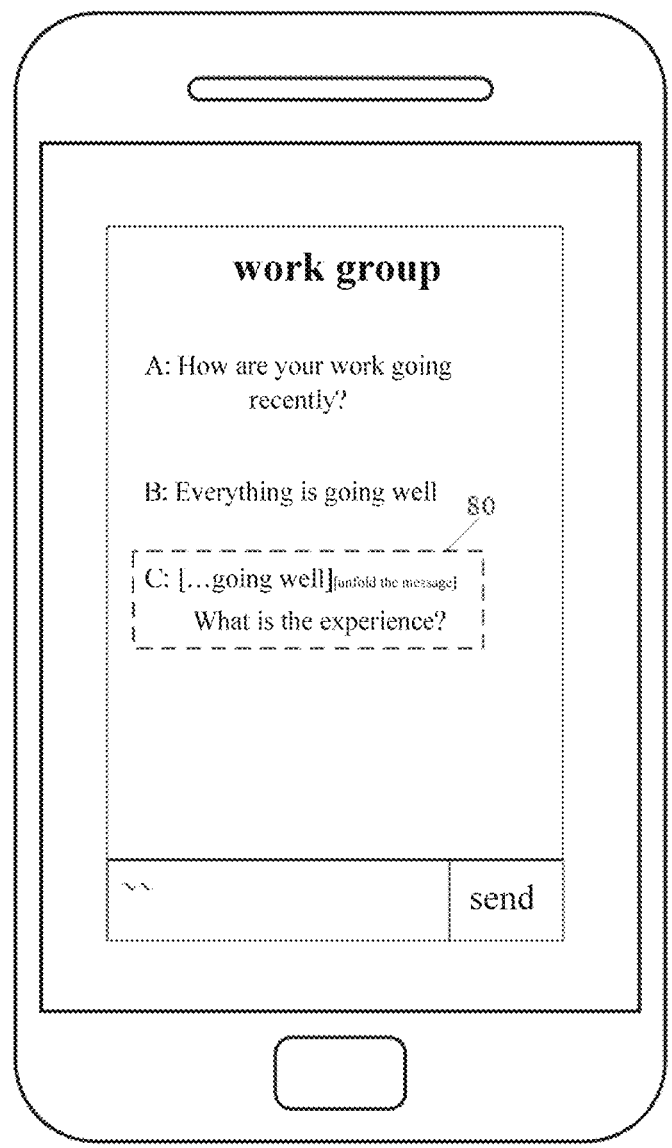
FIG. 10 is a schematic effect diagram of a message processing method according to some embodiments of the present disclosure.

In some embodiments, in order to facilitate the user to be aware of that a message is folded, referring FIG. 10, the server can add an additional annotation following the folded message, for example, the additional annotation can be "[unfold the message]" or "[unfold the folded message]". In this way, after seeing the additional annotation, the user can click the additional annotation to unfold the whole message. For example, the target message is folded, and a display effect of the target message after being unfold is as shown in FIG. 8.

It should be noted that, FIG. 8 and FIG. 10 only illustrate the case where the target message is folded as an example. It will be appreciated to those skilled in the art that the remarking message or both the target message and the remarking message can be folded according to specific application scenarios, which also falls into the protection scope of the present disclosure.

In order to prevent a user who cannot timely check the message from missing the remarking message, in some embodiments of the present disclosure, the server 30 is capable of acquiring the marking identification and determining a sender (such as User B) of the target message corresponding to the marking identification. Then, the server 30 will notify the sender in a preset manner, so as to facilitate the user to timely check the remarking message and the remarking content.

In some embodiments, the preset manner includes but is not limited to at least one selected from: popping-up a message window, flicker, text prompt and voice prompt. In some embodiments, popping-up a message window is used as the preset notifying manner. The server 30 adds a window popping-up instruction. After receiving the message and the window popping-up instruction, the electronic device forcibly pops up a display window in a display interface of the electronic device according to the window popping-up instruction, and displays the remarking message, the at least a part of the target message and the associative identification in the display region. In this way, the user can read the above message in time and avoid missing important remarking message. Other notifying manners like the flicker, the text prompt and the voice prompt can be set according to specific scenarios, which will not be elaborated herein.

In practice, a user may forget the scene at which the target message is sent and need to return to an original location of the target message for review. For this, in some embodiments, the server 30 monitors a positioning operation for the marking identification from the sender, and sends the target message and its context to the electronic device of the sender after the positioning operation for the marking identification is detected. In this way, the chatting scene is restored, thereby facilitating the sender to learn the target message and the remarking message in time, and improving the reading efficiency.

It is to be understood that, the remarking message is assigned to the sender of the at least a part of the target message. However, in some embodiments, considering that other users in the group chatting scenario may also want to locate the message, the server can also monitor the positioning operation from other users, and send the target message and its context to an electronic device of a user with a positioning requirement when the positioning operation from the user is detected, thereby facilitating other users to learn the target message and the remarking message in time, and improving the reading efficiency. It will be appreciated that such embodiments also fall into the protection scope of the present disclosure.

Therefore, according to embodiments of the present disclosure, the server sends the marking identification to the electronic device. As the marking identification can be located, it is convenient for the user to check the target message and its context in time, which is helpful to accurately understand the remarking message. Moreover, according to embodiments of the present disclosure, the remarking message can be associated with the target message by means of the marking identification, which is convenient for all users to read the remarking message and the target message being remarked, thereby improving the reading efficiency and increasing the fun of chatting.

In some embodiments of the present disclosure, there is further provided a message processing apparatus.

Figure 11:
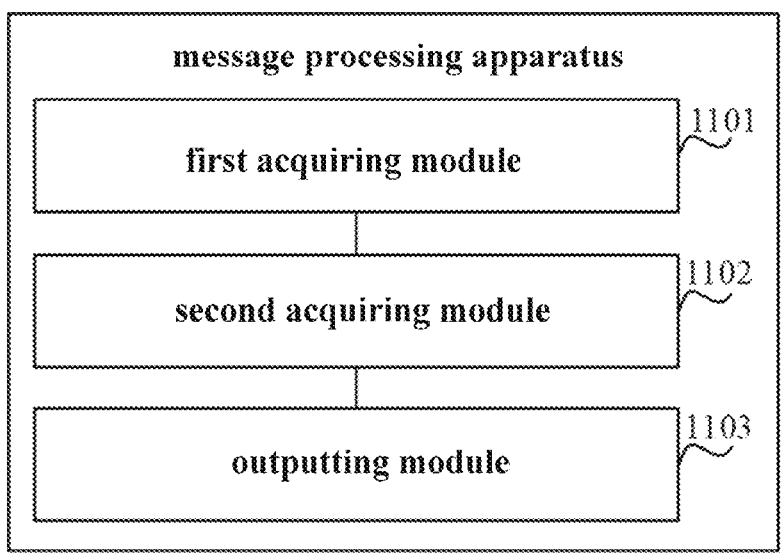
FIG. 11 is a block diagram of a message processing apparatus according to some embodiments of the present disclosure.

FIG. 11 is a block diagram of a message processing apparatus according to some embodiments of the present disclosure. As illustrated in FIG. 11, the message processing apparatus 1100 includes a first acquiring module 1101, a second acquiring module 1102 and an outputting module 1103.

The various circuits, device components, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

The first acquiring module 1101 is configured to acquire a mark adding operation for at least a part of a target message.

The second acquiring module 1102 is configured to acquire an input remarking message according to the mark adding operation.

The outputting module 1103 is configured to output a marking identification for the remarking message. The marking identification includes the remarking message and an associative identification for associating the remarking message with the target message.

In some embodiments, the target message is an instant message. The target message includes at least one selected from a text message, a voice message, an image message and a video message.

In some embodiments, the target message is the text message, and the at least a part of the target message is at least a part of the text message; or the target message is the voice message, and the at least a part of the target message is at least a segment of the voice message; or the target message is the image message, and the at least a part of the target message is at least a region of the image message; or the target message is a video message, and the at least a part of the target message is at least a segment of the video message.

Alternatively, the target message is the instant message. The target message includes at least one selected from the text message, the voice message, the image message and the video message.

Alternatively, the target message is the text message, and the at least a part of the target message is at least a part of the text message.

Alternatively, the target message is the voice message, and the at least a part of the target message is at least a segment of the voice message.

Alternatively, the target message is the image message, and the at least a part of the target message is at least a region of the image message.

Alternatively, the target message is the video message, and the at least a part of the target message is at least a segment of the video message.

In some embodiments, the outputting module includes at least one selected from a first displaying unit and a second displaying unit.

The first displaying unit is configured to display the associative identification directing at the remarking message and the target message, where the associative identification is an identifier pointing to the remarking message and the target message.

The second displaying unit is configured to display the same associative identification added for the remarking message and the target message. The associative identification includes at least one selected from a frame, a symbol and format transformation.

In some embodiments, the marking identification further includes information of a user adding the remarking message.

It will be appreciated that, the message processing apparatus according to embodiments of the present disclosure corresponds to the message processing method according to embodiments of the present disclosure, and thus the detailed descriptions made in embodiments hereinbefore with respect to the message processing method are also applicable to the message processing apparatus, which will not be elaborated herein again.

Figure 12:
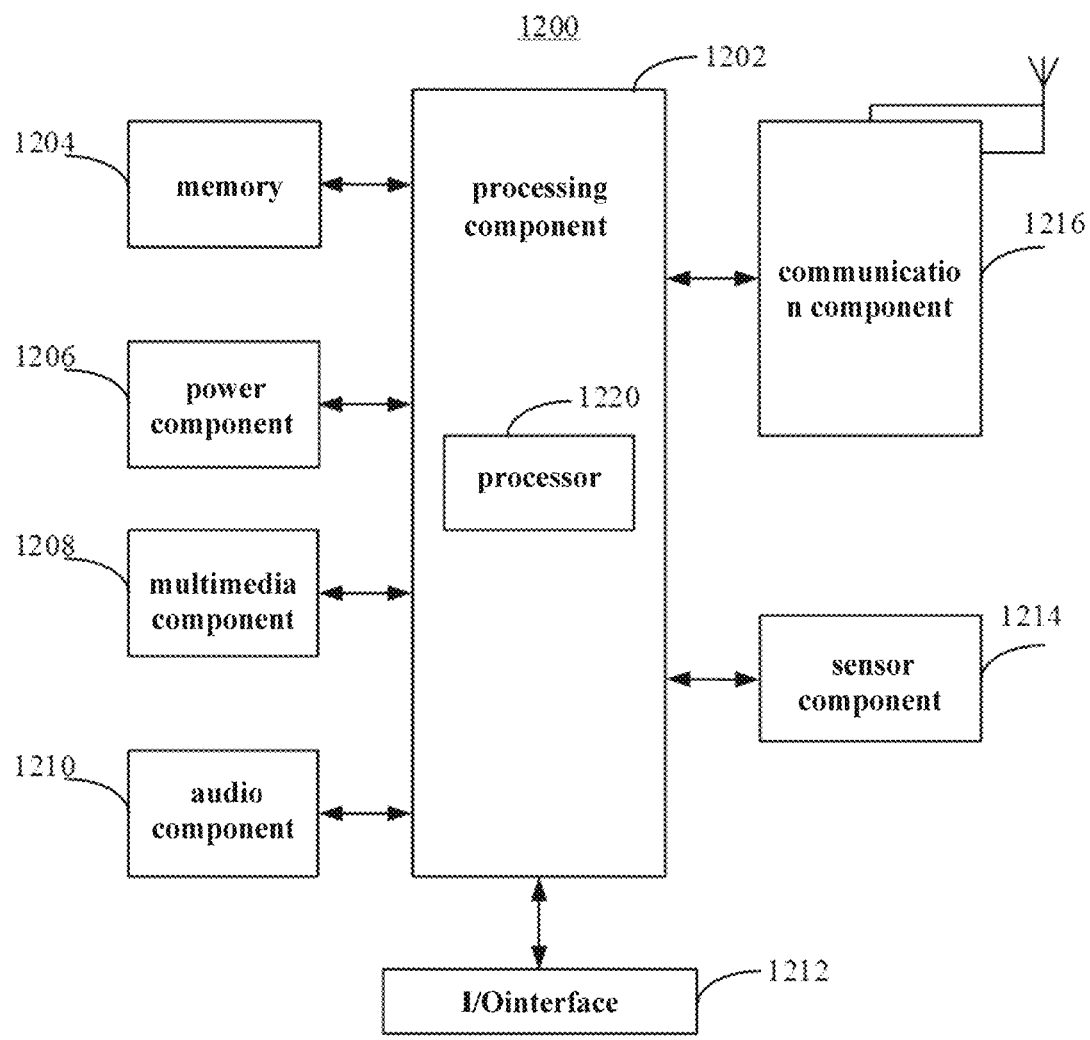
FIG. 12 is a block diagram of an electronic device according to some embodiments of the present disclosure.

FIG. 12 is a block diagram of an electronic device 1200 according to some embodiments of the present disclosure. For example, the electronic device 1200 can be a mobile phone, a tablet computer, an ebook reader, a multimedia player, a wearable device, vehicle terminal, and the like.

Referring to FIG. 12, the electronic device 1200 can include one or more of the following components: a processing component 1202, a memory 1204, a power component 1206, a multimedia component 1208, an audio component 1210 an input/output (I/O) interface 1212, a sensor component 1214, and a communication component 1216.

The processing component 1202 typically controls overall operations of the electronic device 1200, such as the operations associated with display, telephone calls, data communications, camera operations, and recording operations. The processing component 1202 can include one or more processors 1220 to execute instructions to perform all or part of the acts in the above described methods. Moreover, the processing component 1202 can include one or more modules which facilitate the interaction between the processing component 1202 and other components.

For example, the processing component 1202 can include a multimedia module to facilitate the interaction between the multimedia component 1208 and the processing component 1202. For another example, the processing component 1202 can read the executable instructions from the memory to execute all or part of the acts of the message processing method as described in embodiments hereinbefore.

The memory 1204 is configured to store various types of data to support the operation of the electronic device 1200. Examples of such data include instructions for any applications or methods operated on the electronic device 1200, contact data, phonebook data, messages, pictures, video, etc. The memory 1204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the electronic device 1200. The power component 1206 can include a power management system, one or more power sources, and any other components associated with the generation, management, and distribution of power in the electronic device 1200.

The multimedia component 1208 includes a screen providing an output interface between the electronic device 1200 and the user. In some embodiments, the multimedia component 1208 includes a front camera and/or a rear camera. The front camera and/or the rear camera can receive an external multimedia datum while the electronic device 1200 is in an operation mode, such as a photographing mode or a video mode. Each of the front camera and the rear camera can be a fixed optical lens system or have focus and optical zoom capability.

The audio component 1210 is configured to output and/or input audio signals. For example, the audio component 1210 includes a microphone ("MIC") configured to receive an external audio signal when the electronic device 1200 is in an operation mode, such as a call mode, a recording mode, and a voice recognition mode. The received audio signal can be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like.

The buttons can include, but are not limited to, a home button, a volume button, a starting button, and a locking button.

The sensor component 1214 includes one or more sensors to provide status assessments of various aspects of the electronic device 1200. For instance, the sensor component 1214 can detect an open/closed status of the electronic device 1200, relative positioning of components, e.g., the display and the keypad, of the electronic device 1200, a change in position of the electronic device 1200 or a component of the electronic device 1200, a presence or absence of user contact with the electronic device 1200, an orientation or an acceleration/deceleration of the electronic device 1200, and a change in temperature of the electronic device 1200. The sensor component 1214 can include a proximity sensor configured to detect the presence of nearby objects without any physical contact. The sensor component 1214 can also include a light sensor, such as a CMOS or CCD image sensor, for use in imaging applications. In some embodiments, the sensor component 1214 can also include an accelerometer sensor, a gyroscope sensor, a magnetic sensor, a pressure sensor, or a temperature sensor.

The communication component 1216 is configured to facilitate communication, wired or wirelessly, between the electronic device 1200 and other devices. The electronic device 1200 can access a wireless network based on a communication standard, such as Wi-Fi, 2G, 3G, 4G, 5G or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 1200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory machine-readable storage medium including instructions, such as included in the memory 1204, executable by the processor 1220 in the electronic device 1200, for performing the above-described methods. For example, the non-transitory computer-readable storage medium can be a ROM, a RAM, a CD-ROM, a magnetic tape, a floppy disc, an optical data storage device, and the like.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A message processing method, comprising:
acquiring a mark adding operation for at least a part of a target message, wherein the mark adding operation comprises selecting the part of the target message, and the target message is an instant message;
wherein
the target message comprises a voice message or a video message, the part of the target message is at least a segment of the voice message or the video message, and the mark adding operation is a segment selecting operation which includes a starting time point and an ending time point;
acquiring an input remarking message according to the mark adding operation; and
outputting the part of the target message and a marking identification for the remarking message simultaneously,
wherein the marking identification comprises the remarking message and an associative identification for associating the remarking message with the target message, and
wherein the associative identification comprises a text box with two connecting lines extending from a top corner of the text box, one connecting line of the two connecting lines points to the starting time point of the segment, and another connecting line of the two connecting lines points to the ending time point of the segment, and wherein the remarking message is contained in the text box.

2. The message processing method according to claim 1, wherein the marking identification further comprises information of a user adding the remarking message.

3. A mobile phone implementing the message processing method according to claim 1, the mobile phone comprising a touch screen and a speaker, the method further comprising displaying the target message on the touch screen or playing the target message on the speaker, wherein the mobile phone is configured to facilitate users of a group chatting application to locate the target message, and timely check the target message and the remarking message through a group chatting application, thereby reducing time for finding the target message.

4. The message processing method according to claim 1, wherein the associative identification comprises an arrow, an end of the arrow points to the part of the target message, and another end of arrow points to the remarking message.

5. The message processing method according to claim 1, wherein the associative identification comprises a single-headed arrow, a head of the single-headed arrow points to the part of the target message, and the remarking message is located adjacent to a tail of the single-headed arrow.

6. The message processing method according to claim 1, wherein the associative identification comprises a double-headed arrow, a head of the double-headed arrow points to the part of the target message, and another head of the double-headed arrow points to the remarking message.

7. The message processing method according to claim 1, wherein the associative identification comprises a frame, and wherein the frame is a solid line frame or a dotted line frame.

8. The message processing method according to claim 1, wherein the associative identification comprises a frame, and wherein the frame is a rectangular frame, an elliptical frame, or a diamond frame.

9. The message processing method according to claim 1, wherein the associative identification comprises a symbol, and wherein the symbol comprises at least one of parentheses, single quotation marks, double quotation marks, marks of emphasis and underline.

10. The message processing method according to claim 1, wherein the associative identification comprises a format transformation, and wherein the format transformation comprises at least one of style transformation, font transformation, and color transformation.

11. An electronic device, comprising:
a processor; and a memory for storing instructions executable by the processor;

wherein the processor is configured to read the executable instructions from the memory to execute a message processing method comprising:

acquiring a mark adding operation for at least a part of a target message, wherein the mark adding operation comprises selecting the part of the target message, and the target message is an instant message;

wherein the target message comprises a voice message or a video message, the part of the target message is at least a segment of the voice message or the video message, and the mark adding operation is a segment selecting operation which includes a starting time point and an ending time point;

acquiring an input remarking message according to the mark adding operation; and outputting the part of the target message and a marking identification for the remarking message simultaneously, wherein the marking identification comprises the remarking message and an associative identification for associating the remarking message with the target message, wherein the associative identification comprises a text box with two connecting lines extending from a top corner of the text box, one connecting line of the two connecting lines points to the starting time point of the segment, and another connecting line of the two connecting lines points to the ending point of the segment, and wherein the remarking message is contained in the text box.

12. The electronic device according to claim 11, wherein the marking identification further comprises information of a user adding the remarking message.

13. A non-transitory computer-readable storage medium having stored therein instructions executable by the computer, wherein the instructions, when executed, cause a message processing method to be performed, the message processing method comprising:

acquiring a mark adding operation for at least a part of a target message, wherein the mark adding operation comprises selecting the part of the target message, and the target message is an instant message;

wherein the target message comprises a voice message or a video message, the part of the target message is at least a segment of the voice message or the video message, and the mark adding operation is a segment selecting operation which includes a starting time point and an ending time point;

acquiring an input remarking message according to the mark adding operation; and outputting the part of the target message and a marking identification for the remarking message simultaneously, wherein the marking identification comprises the remarking message and an associative identification for associating the remarking message with the target message, wherein the associative identification comprises a text box with two connecting lines extending from a top corner of the text box, one connecting line of the two connecting lines points to the starting time point of the segment, and another connecting line of the two connecting lines points to the ending point of the segment, and wherein the remarking message is contained in the text box.

14. The non-transitory computer-readable storage medium according to claim 13, wherein the marking identification further comprises information of a user adding the remarking message.

* * * * *